July 4, 1933.  S. M. RANSOME  1,916,990
INDEXING MECHANISM
Filed Dec. 7, 1931   2 Sheets-Sheet 1

INVENTOR
Stafford M. Ransome
BY Chindahl, Parker & Carlson
ATTORNEYS

July 4, 1933.  S. M. RANSOME  1,916,990
INDEXING MECHANISM
Filed Dec. 7, 1931    2 Sheets-Sheet 2
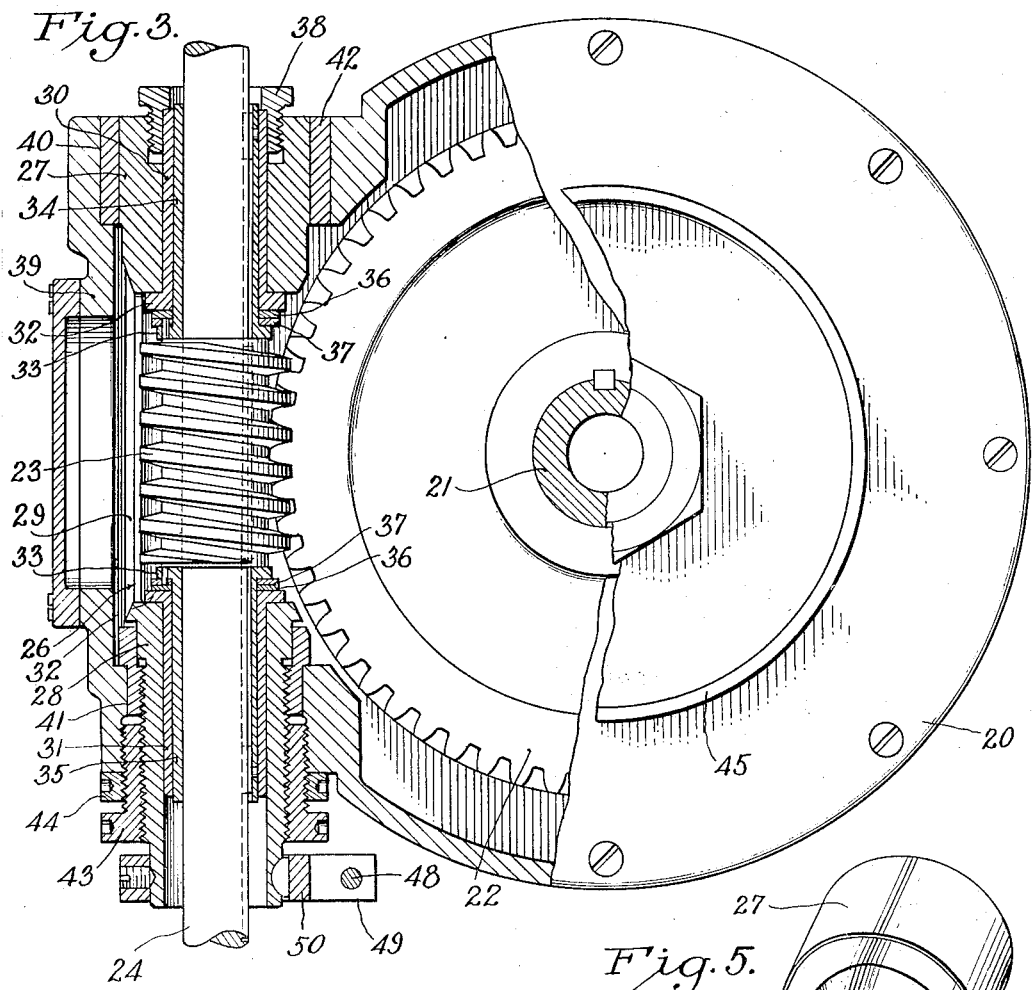
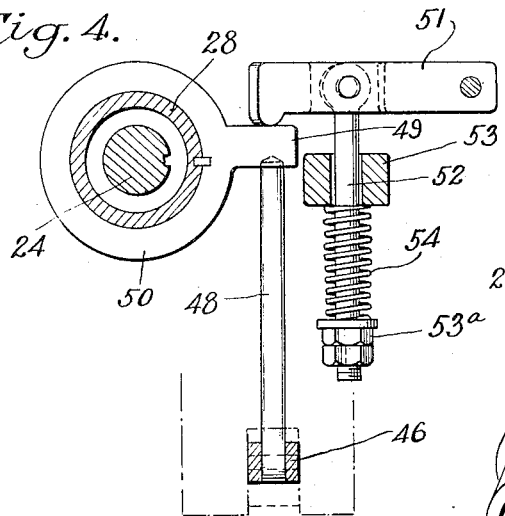
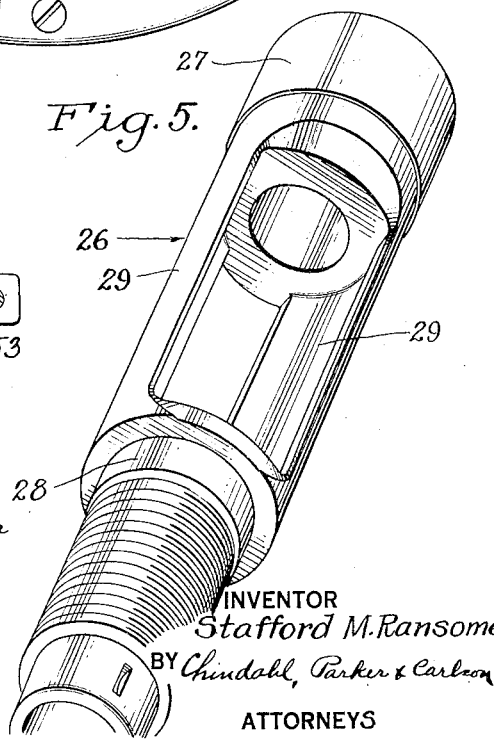
INVENTOR
Stafford M. Ransome
BY Chindahl, Parker & Carlson
ATTORNEYS Patented July 4, 1933

1,916,990

UNITED STATES PATENT OFFICE

STAFFORD M. RANSOME, OF ROCKFORD, ILLINOIS, ASSIGNOR TO BARBER-COLMAN COMPANY, OF ROCKFORD, ILLINOIS, A CORPORATION OF ILLINOIS

INDEXING MECHANISM

Application filed December 7, 1931. Serial No. 579,515.

The invention relates to improvements in compensating devices for gear drives, such for example as indexing mechanisms for gear cutting machines or the like.

Gear drives of various forms, as well as worm and worm wheel drives, are subject to inaccuracies due to irregularities and slight positive and negative errors in the form of the various gear teeth. This drunkenness in the drive obviously prevents accurate or reliable positioning of the driven member, as for example the indexing work spindle in a gear cutting machine.

The general object of the invention is to provide a power transmission mechanism which includes novel means for automatically compensating for inaccuracies.

Another object is to provide a novel worm and worm wheel drive comprising calibrated means automatically operable through control of the relative position of the worm and worm wheel to compensate for inaccuracies so that the worm wheel and parts actuated thereby will be actuated in uniformly timed relation to the rotation of the worm.

Other objects and advantages will become apparent from the following description taken in connection with the accompanying drawings, in which:

Fig. 3 is an enlarged elevational view, partially in section, of the preferred form of drive.

Fig. 4 is a fragmentary view of part of the drive.

Fig. 5 is an enlarged perspective view of a detail of the drive.

While the invention is adapted for use in connection with a variety of machines requiring operation of a part, either continuously or intermittently, it is for purposes of illustration herein shown and described as an indexing mechanism in a hobbing machine of standard construction.

Figure 1:
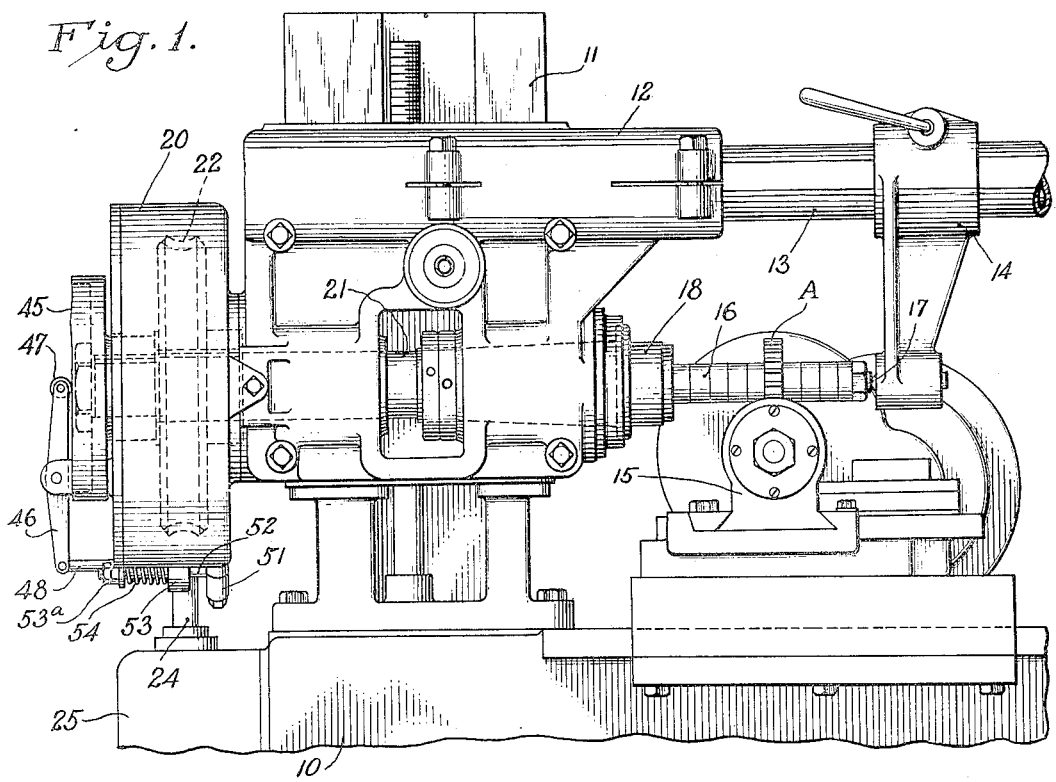
Figure 1 is a fragmentary side elevational view of a hobbing machine which comprises a drive embodying the features of the invention.
Figure 2:
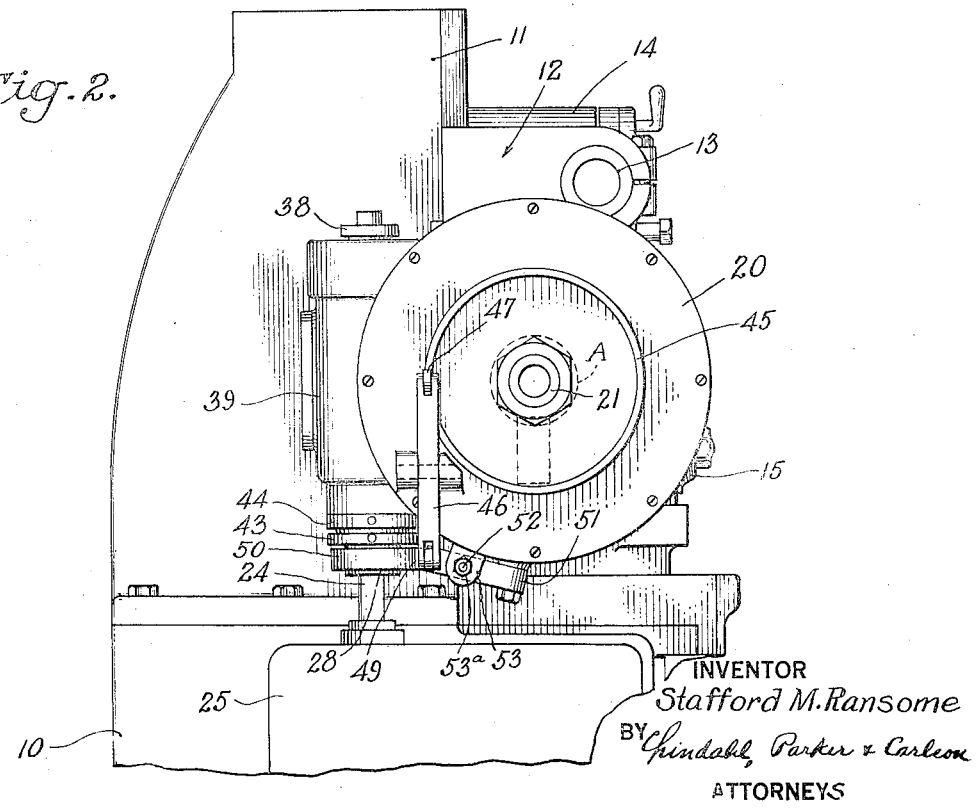
Fig. 2 is a fragmentary end elevational view of the hobbing machine.

Referring to Figs. 1 and 2 of the drawings, the hobbing machine is illustrated as comprising a base 10 on which is mounted an upright or standard 11 supporting a vertically adjustable headstock 12. Extending from the headstock is a horizontal beam 13 serving as a supporting guide for an adjustable depending tailstock bracket 14. Mounted on the base 10 for reciprocation relative thereto is a tool slide 15.

The work is supported by the headstock 12 and tailstock 14, and, in the present instance, is illustrated as a gear blank A mounted on an arbor 16 which is rotatably mounted in a fixed position by center 17 in the tailstock and a chuck 18 rotatably mounted on the headstock 12.

To rotate the chuck 18, and hence the work blank A, accurately, an indexing drive mechanism embodying the features of the invention is provided. The present embodiment of this indexing drive mechanism comprises generally a driving element and a driven element meshing therewith. Either or both of said elements may have some inaccuracies, in spite of the best methods of manufacture, known at present, which, unless compensated for, would result in inaccurate positioning of the work blank A. To correct this, means is provided which compensates for the net or cooperative inaccuracy of said elements automatically during the operation thereof so that the work blank is correctly positioned at all times.

As shown in the drawings, the indexing drive mechanism comprises a housing 20 rigidly secured to the headstock 12 and receiving one end of a spindle 21 journaled in the headstock, the other end of the spindle 21 being secured to the chuck 18 for rotating the latter. Within the housing 20 are mounted the driving and driven elements, the latter comprising, in the present instance, a worm wheel 22 secured on the spindle 21. The driving element comprises a worm 23 meshing with the worm wheel 22 and secured for rotation with a vertical shaft 24 but slidable axially thereof so that the headstock 12, to which the housing 20 is rigidly secured, may be adjusted vertically. The shaft 24 extends upwardly from a gear box 25 on the base 10 from which it is driven continuously or intermittently in accordance with the requirements of the gear cutting operation.

The worm 23 and the worm wheel 22, regardless of the care used in their manufacture, may have certain inaccuracies, the net or cooperative result of which is the failure to rotate the spindle 21, and hence to position the work blank A correctly relative to the hobbing tool (not shown). Such inaccuracies in any particular worm and worm wheel drive may be measured for all points in the rotation of the worm wheel 22.

Variation from a theoretically correct relationship between the worm and worm wheel resulting from manufacturing inaccuracies, may be compensated for when ascertained by effecting a correlated relative adjustment between the worm and worm wheel. The present invention contemplates the provision of means calibrated to the inaccuracies existing in any particular instance for automatically adjusting the worm 23 axially in accordance with such inaccuracies so as to offset the normal effect of the latter. To this end, the worm 23 is rotatably mounted in a support which may be shifted to move the worm axially, and means is provided for shifting said support, which means includes a cam formed in accordance with the cooperative inaccuracy of the worm and worm wheel.

As illustrated in the drawings, the support for the worm 23 is in the form of a cage, indicated generally at 26, which comprises a pair of axially spaced sleeves 27 and 28 connected by opposed laterally arcuate bars 29 preferably integral therewith. The sleeves 27 and 28 and the bars 29 define a chamber in which the worm 23 is adapted to be mounted, the space between the bars providing clearance permitting the worm to mesh with the worm wheel 22 and permitting limited rotary adjustment of the cage 26 relative to the worm wheel. Two bearing sleeves 30 and 31 are secured in the spaced sleeves 27 and 28, and have peripheral end flanges 32 engaging respectively against the inner adjacent ends of the sleeves 27 and 28. Rotatably disposed in the sleeves 30 and 31 and having peripheral flanges 33 on their inner adjacent ends in parallel spaced relation to the flanges 32, are two rotatable sleeves 34 and 35. Suitable bearing washers 36 and 37 are disposed between each set of flanges 32 and 33 and are secured respectively thereto. The shaft 24 extends through and is slidably splined to the sleeves 34 and 35. The worm 23, splined to the shaft 24 is disposed in end-abutting engagement between the peripheral end flanges 33. A gland nut 38 is threaded into the outer end of the sleeve 27 and is formed with an inner shoulder engaging the outer end of the sleeve 30.

The cage 26 is adjustably mounted in the housing 20 for the purpose of imparting axial movement to the worm 23 as necessitated to compensate for discrepancies from a true theoretical relationship between the worm and the worm wheel 22 in all positions of drive. In the present instance, the housing 20 is formed with a generally tubular extension 39 at one side, which is formed at its ends with axially spaced openings 40 and 41. The sleeve 27 of the cage 26 has a smooth rotary and sliding fit with a bearing ring 42 secured in the opening 40. The other end of the cage 26, namely the sleeve 28 is externally threaded into a nut 43 which is adjustably secured in the housing, as for example by being threaded into the outer end of the opening 41 and locked in adjusted position by means of a lock nut 44.

To shift the worm axially to rotate the worm wheel sufficiently to compensate for the cooperative inaccuracy thereof, means is provided for turning the cage 26 in the nut 43, which means is operated during, and by virtue of, the rotation of one of the rotary elements, namely, the worm and worm wheel, and includes a cam calibrated in accordance with the cooperative inaccuracy of said elements and preferably mounted for rotation with one of said elements. In the present instance, the cam, indicated at 45, is preferably secured on the spindle 21 for rotation therewith and externally of the housing 20. The cam is cup-shaped and the face of the rim is formed in accordance with the previously measured cooperative inaccuracy of the worm and worm wheel.

Pivotally mounted intermediate its ends on the casing 20 is a lever 46 of which one end carries a roller 47 coacting with the cam face 45, and of which the other end is pivotally connected to one end of a push rod 48. The free end of the rod 48 bears against a lug 49 on a ring 50 secured to the outer end of the sleeve 28 of the cage 26 for rotation therewith.

To hold the lug 49 in contact with the rod 48 and hence the roller 47 in contact with the cam 45, a lever 51 pivotally supported at one end on the housing 20 bears at the other end against the lug 49 opposite the rod 48, and is pivotally connected intermediate its ends to a spring-anchored rod 52. Preferably, the rod 52 extends through a lug 53 on the casing, and carries an adjustable abutment 53ª on its free end. A coiled compression spring 54 is disposed on the rod 52 in end abutting engagement with the lug 53 and the abutment.

In the operation of the device, during the rotation of the worm 23 and worm wheel 22, certain variations in the position of the spindle 21 from the correct position therefor may occur because of the cooperative inaccuracy of the worm and worm wheel. The cam 45, being calibrated in accordance with such cooperative inaccuracy, is operable through the intervening connection to rotatably adjust the cage 26, thereby shifting the worm 23 axially to compensate for the inaccuracy at all points in the rotation of the worm wheel 22.

I claim as my invention:

1. A drive mechanism comprising, in combination, a housing, a drive shaft rotatably mounted in said housing, a worm mounted in said housing for rotation with said shaft, a worm wheel mounted for rotation in said housing and meshing with said worm, a cam mounted externally of said housing for rotation with said worm wheel and formed in accordance with the cooperative inaccuracy of said worm and worm wheel, and means actuated by said cam and extending into said housing for shifting said worm axially in said housing, whereby said worm wheel is rotated to compensate for said cooperative inaccuracy.

2. A drive mechanism comprising, in combination, a housing, a driven element comprising a worm wheel rotatably mounted in said housing, a driving element comprising a worm mounted in said housing, a supporting cage for said worm mounted for movement in said housing axially of said worm and having a portion extending externally of said housing, a cam mounted externally of said housing for rotation with one of said elements and formed in accordance with the cooperative inaccuracy of said elements, and means actuated by said cam and connected to the external portion of said cage for moving said cage whereby said worm may be moved axially to rotate said worm wheel sufficiently to compensate for said cooperative inaccuracy.

3. A drive mechanism comprising, in combination, a housing, a driven element comprising a worm wheel rotatably mounted in said housing, a driving element comprising a worm, a cage rotatably supporting said worm and threaded in said housing axially of said worm, a cam mounted for rotation with one of said elements and formed in accordance with the cooperative inacuuarcy of said elements, and means actuated by said cam for turning said cage whereby said cage and said worm may be moved axially to rotate said worm wheel sufficiently to compensate for said cooperative inaccuracy.

4. A drive mechanism comprising, in combination, a housing, a worm wheel rotatably mounted in said housing, a worm, a cage having end portions rotatably supporting said worm therebetween and threaded in said housing axially of said worm, a cam mounted for rotation with said worm wheel and formed in accordance with the cooperative inaccuracy of said worm and worm wheel, and means actuated by said cam for turning said cage whereby said cage and said worm may be moved axially to rotate said worm wheel sufficiently to compensate for said cooperative inaccuracy.

5. A drive mechanism comprising, in combination, a housing, a worm wheel rotatably mounted in said housing, a worm, a cage rotatably supporting said worm and threaded in said housing axially of said worm, a shaft journaled in said cage and having a driving connection with said worm, said cage and said worm being slidable as a unit axially of said shaft, a cam mounted for rotation with said worm wheel and formed in accordance with the cooperative inaccuracy of said worm and worm wheel, and means actuated by said cam for turning said cage whereby said cage and said worm may be slid axially along said shaft to rotate said worm wheel sufficiently to compensate for said cooperative inaccuracy.

6. A drive mechanism comprising, in combination, a housing, a worm wheel rotatably mounted in said housing, a threaded member adjustably mounted in said housing, a worm, a cage rotatably supporting said worm and threaded into said member, a cam mounted for rotation with said worm wheel and formed in accordance with the cooperative inaccuracy of said worm and worm wheel, and means actuated by said cam for turning said cage whereby said cage and said worm may be moved axially to rotate said worm wheel sufficiently to compensate for said cooperative inaccuracy.

7. A drive mechanism comprising, in combination, a housing, a worm wheel rotatably mounted in said housing, a threaded member adjustably mounted in said housing, a worm, a cage for rotatably supporting said worm having one end threaded in said member and its other end slidably and rotatably supported in said housing, a cam mounted for rotation with said worm wheel and formed in accordance with the cooperative inaccuracy of said worm and worm wheel, and means actuated by said cam for turning said cage whereby said cage and said worm may be moved in said housing axially of said worm to rotate said worm wheel sufficiently to compensate for said cooperative inaccuracy.

8. A drive mechanism comprising, in combination, a housing, a worm wheel rotatably mounted in said housing, a worm, a cage rotatably supporting said worm and threaded in said housing axially of said worm, a radially extending arm secured to said cage for rotation therewith, a cam mounted for rotation with said worm wheel and formed in accordance with the cooperative inaccuracy of said worm and worm wheel, a lever pivotally supported intermediate its ends and having a roller at one end bearing against said cam and having a rod at the other end bearing against said arm to turn said cage when the lever is moved by said cam, and spring-pressed means holding said arm in contact with said rod and said roller in contact with said cam.

9. A drive mechanism comprising, in combination, a rotatably mounted worm wheel, a worm meshing with said wheel, an axially shiftable cage rotatably supporting said worm and mounted coaxially therewith, a cam mounted for rotation with said wheel and formed in accordance with the cooperative inaccuracy of said worm and wheel, and means operable by said cam for shifting said cage axially whereby said worm is rotated to compensate for said cooperative inaccuracy.

10. A drive mechanism comprising, in combination, a housing, a worm wheel rotatably mounted in said housing, a cage, a worm rotatably supported between the ends of said cage, said cage having an extension at one end threaded in said housing, a radially extending arm mounted on the outer end of said extension for rotation therewith, a cam mounted for rotation with said worm wheel and formed in accordance with the cooperative inaccuracy of said worm and wheel, and means actuated by said cam for swinging said arm whereby said cage and worm may be moved axially to rotate said wheel to compensate for said cooperative inaccuracy.

11. A drive mechanism comprising, in combination, a housing, a worm wheel rotatably mounted in said housing, a cage mounted in said housing, a worm rotatably supported by said cage, said cage having one end threaded in said housing with a portion thereof extending externally of said housing, a cam mounted externally of said housing for rotation with said worm wheel and formed in accordance with the cooperative inaccuracy of said worm and wheel, and means connected with said portion of the cage and actuated by said cam for rotating said cage whereby the worm may be moved axially to rotate said wheel to compensate for said cooperative inaccuracy.

In testimony whereof, I have hereunto affixed my signature.

STAFFORD M. RANSOME.